Figures 1, 2:
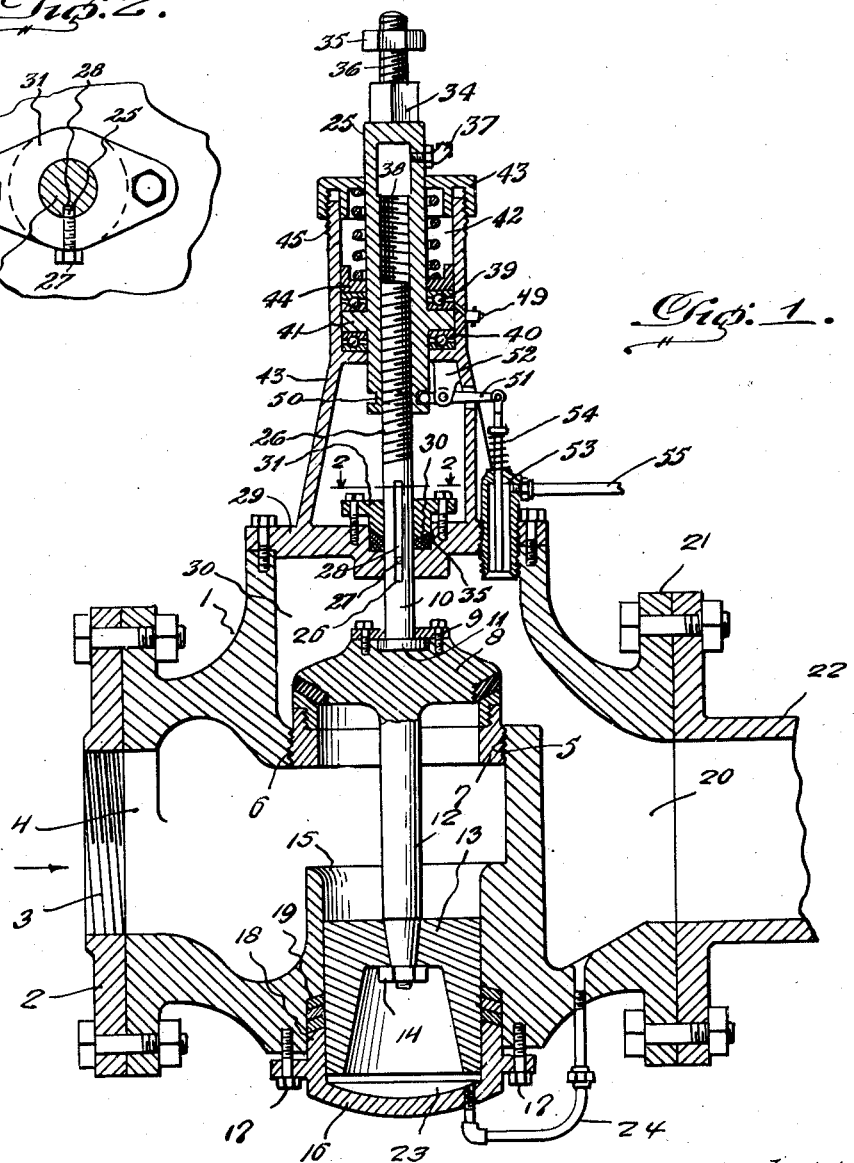

Oct. 11, 1949. W. B. WALGER 2,484,199
THROTTLE VALVE MECHANISM
Filed Jan. 11, 1946

Inventor
Walter B. Walger,
By
Attorneys

Patented Oct. 11, 1949

2,484,199

UNITED STATES PATENT OFFICE 2,484,199

THROTTLE VALVE MECHANISM

Walter B. Walger, El Campo, Tex.

Application January 11, 1946, Serial No. 640,458

1 Claim. (Cl. 277—12)

This invention relates to new and useful improvements in a throttle valve mechanism.

One object of the invention is to provide a mechanism of the character described specially designed for the purpose of controlling the application of motive fluid, such as steam, from a generator, such as a boiler, to the apparatus to be driven, such as an engine, and embodies a controlling valve incorporated into a structure such that the valve will be substantially balanced, at all times, between equal or unequal fluid pressures, to the end that the valve may be at all times easily opened or closed irrespective of the pressure of the motive fluid.

Another object of the invention is to provide a valve mechanism of the character described embodying also a release valve through which the pressure fluid from the engine may be relieved, by the operator, if desired, when the controlling valve of the mechanism is closed.

The valve is also capable of general application for use in controlling the flow of any fluid under pressure, through a flow line or fluid passageway.

A further feature of the invention resides in the provision of a valve mechanism of the character described which is of very simple construction may be cheaply produced, readily repaired and which is very efficient, in operation.

With the above and other objects in view, the invention has particular relation to certain novel features of construction operation and arrangement of parts an example of which is given in this specification and illustrated in the accompanying drawing, wherein:

The figure shows a longitudinal sectional view of the valve mechanism.

Referring now more particularly to the drawing, the numeral 1 represents a casing having bolted thereto at one end a plate 2, which contains an aperture 3 registering with an opening 4 in the casing 1, the aperture 3 being threaded for engagement with a flow line for steam or liquid under pressure.

The opening 4 communicates with an opening 5 in a transverse web 6 associated with the casing 1. Threadably engaged in the opening 5 is a valve seat 7 in which may be seated the control valve 8, to which may be secured by means of a plate 9 bolted to the valve 8 a stem 10, which extends through an aperture in the plate 9 and which comprises an annular shoulder 11 at an end thereof secured under the plate 9.

Extending longitudinally from the valve 8 is a connecting rod 12 which is threadably engaged with a plunger 13, the threaded end portion of the rod 12 being locked to the plunger 13 by means of a lock nut 14.

The plunger 13 reciprocates within a cylinder 15, closed at one end by a cap gland 16, bolted to the casing 1 by means of bolts 17 extending through an annular shoulder integral with the gland 16, the gland 16 comprising a portion 18 which extends upwardly within the cylinder 15, and which serves to compress packing 19 the latter serving to provide a tight joint between the walls of the cylinder 15, the plunger 13 and the gland 16.

The casing 1 comprises an opening 20 substantially coaxial with the opening 4, and a flange 21 to which may be bolted a pipe 22 extending to an engine, flow line, pump or other machine intended to be controlled by the valve.

Communicating between the outlet opening 20 and a compartment 23 in the under side of the plunger 13, is a by-pass pipe 24 which serves to equalize pressures, whereby the upward pressure on the plunger 13 is at all times substantially equal to that existing in the outlet pipe 22.

It will further be clear from the detailed description so far, that valve 8 is subjected to two equal and opposing forces, provided by the action of the pressure applied to the plunger 13 and the valve 8, whereby the valve 8 may be opened easily and will not bind as might be the case were valve 8 subjected to unbalanced pressures.

The stem 10 is actuated by a shaft 25, threaded internally to threadably engage a threaded portion 26 of the stem 10. The stem 10 is prevented from rotation by means of a pin 27, extending through a spline 28 in the stem 10, and secured to a cover plate 29 for the chamber 30. Steam or other fluid is prevented from leaking past the stem 10 by means of a gland 31 comprising packing 32 compressed within the closure 33. Polygonal shoulders 34 are provided at the upper end of the shaft 25, to enable actuation of the shaft 25 as by means of a suitable wrench or hand wheel secured on by a nut 35 on a threaded extension 36 of shaft 25. A suitable fitting 37 is provided for lubricating the threads 38 of the shaft 25.

The shaft 25 rotates between thrust bearings 39 and 40, mounted respectively above and below an annular shoulder 41 formed on the shaft 25, the said bearings nesting in the chamber of a cylinder 42 supported on and integral with the standard 43 which in turn rests on and is integral with the plate 29. The upper portion of the cylinder 42 is externally threaded for engagement with a cap 43, between which and an annular member 44 extends a compression spring 45. The annular member 44 fits snugly within the cylininder 42 and the pressure which it may exert by virtue of the compressive force of the spring 45 may be adjusted by threaded adjustment of cap 43. A suitable fitting 49 is provided for lubrication of the bearings 40 and 41.

Rotation of shaft 25 will, of course, cause translatory motion of the stem 10, and may cause closure or opening of the control valve 8 dependent upon the sense in which the shaft 25 may be rotated. Upon closure of the valve 8 and in response to still further rotation of the shaft 25 translatory motion of the said shaft 25 will be accomplished, against the pressure provided by the spring 45. In such case, of course, bearing 39 acts as a thrust bearing to facilitate and smooth rotation of the shaft 25.

Formed within the shaft 25 at its lower extremity is an annular cam slot 50 for actuating a lever 51 having a ball end resting in the slot 50, pivoted from an ear 52, and extending externally of the standard 43, to actuate a poppet valve, generally denominated 53, and which communicates with the chamber 30, in such direction as to open the valve 53, against the pressure of a closure spring 54. Valve 53 communicates with the atmosphere by means of a pipe 55 and serves to release pressure from the chamber 30 thereby to effect rapid stoppage of the machine connected to the pipe 22.

It is believed that the many advantages of a throttle valve constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What I claim is:

In a valve for controlling fluid under pressure, a valve casing having an inlet and an outlet opening, a transverse web between said openings having an aperture therein, a cylinder at one side and aligned with said web aperture, and an aperture in the side of said casing opposite said cylinder, an integral cover plate, standard and cylinder secured on said casing over said last-mentioned aperture and providing an internal shoulder between said standard and said integral cylinder, a screw threaded valve stem extending through said cover plate carrying a valve gate operative to open and close the aperture in said web, a plunger in said first-mentioned cylinder, means connecting said plunger to said valve gate, conduit means connecting the interior of said casing at the outlet side of said web with the space between said plunger and the outer closed end of said first-mentioned cylinder, a tubular, interiorly screw-threaded valve shaft extending through said integral cylinder and into said standard and receiving the adjacent screw-threaded end of said valve stem, said valve shaft having an annular shoulder in said cylinder and an annular groove in the end thereof in said standard, a cap threaded onto the outer end of said integral cylinder, a pair of thrust bearings in said integral cylinder disposed one between said internal shoulder and said shaft shoulder and one between said shaft shoulder and said cap, a compression spring in said integral cylinder surrounding said shaft between said last-mentioned thrust bearing and said cap, a relief valve extending through said cover plate into the outlet side of said valve casing, and a relief valve operating lever pivoted to said standard and engaged in said shaft groove to open said relief valve when said shaft is rotated to compress said compression spring after said valve is closed.

WALTER B. WALGER.

REFERENCES CITED

The following references are of record in the file of this patent:

UNITED STATES PATENTS

| Number | Name | Date |
|---|---|---|
| 606,535 | Glauber | June 28, 1898 |
| 809,063 | Jacobs | Jan. 2, 1906 |
| 909,939 | Charmois | Jan. 19, 1909 |
| 968,794 | Peare | Aug. 30, 1910 |
| 1,892,565 | Browne | Dec. 27, 1932 |
| 1,928,071 | Mueller | Sept. 26, 1933 |
| 2,019,193 | Mueller | Oct. 29, 1935 |
| 2,057,886 | Duda | Oct. 20, 1936 |
| 2,212,302 | Morgan | Aug. 20, 1940 |

FOREIGN PATENTS

| Number | Country | Date |
|---|---|---|
| 227,215 | Great Britain | Jan. 15, 1925 |